(12) United States Patent
Yoshihara et al.

(10) Patent No.: US 7,422,083 B2
(45) Date of Patent: Sep. 9, 2008

(54) SNOWMOBILE HAVING A KNUCKLE CONNECTED TO A BODY FRAME VIA AN ARM

(75) Inventors: Masanori Yoshihara, Shizuoka (JP); Kiyoteru Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 326 days.

(21) Appl. No.: 11/346,511

(22) Filed: Feb. 2, 2006

(65) Prior Publication Data

US 2007/0193799 A1   Aug. 23, 2007

(51) Int. Cl.
*B62M 27/02* (2006.01)

(52) U.S. Cl. .................... 180/182; 180/186; 180/190

(58) Field of Classification Search ............... 180/182, 180/186, 190
See application file for complete search history.

(56) References Cited

U.S. PATENT DOCUMENTS

| | | | | |
|---|---|---|---|---|
| 5,029,664 | A * | 7/1991 | Zulawski | 180/190 |
| 6,655,487 | B2 * | 12/2003 | Mallette et al. | 180/190 |
| 2006/0032686 | A1 * | 2/2006 | Berg | 180/190 |
| 2006/0185920 | A1 * | 8/2006 | Hibbert et al. | 180/190 |

* cited by examiner

*Primary Examiner*—Lesley D. Morris
*Assistant Examiner*—Michael R Stabley
(74) *Attorney, Agent, or Firm*—Keating & Bennett, LLP

(57) ABSTRACT

A snowmobile includes a vehicle body frame, an arm connected to the vehicle body frame, and a knuckle connecting the arm and a ski. The knuckle includes a frame and a connection member connecting the arm and the knuckle and the knuckle is arranged inside of the frame.

9 Claims, 7 Drawing Sheets

SNOWMOBILE HAVING A KNUCKLE CONNECTED TO A BODY FRAME VIA AN ARM

BACKGROUND OF THE INVENTION

1. Field of the Invention

The present invention relates to a snowmobile, in particular to a snowmobile in which a knuckle is connected to a vehicle body frame via an arm.

2. Description of the Related Art

In a snowmobile, the structure of a portion of the suspension is known to include a knuckle to which a ski is connected, and the knuckle is in turn connected to an arm which further connects to a vehicle body frame. The knuckle is interposed between the arm to which the suspension is connected and the ski, and transfers the movement of the ski to the arm. In FIG. 39 of U.S. Pat. No. 6,655,487, the arms 454, 456 are connected to the front leg 458 via the pin 466 or the like, and the input from the handlebar 474 is transferred to the steering shaft 470 and the ski 464 via the mechanical linkage 476. Such structure is complex, heavy and costly. In view of such problems, FIG. 42 of U.S. Pat. No. 6,655,487 discloses a structure in which the arm is connected to the knuckle using a ball joint and the like, the extension portion 516 outwardly projects from the frame which defines the knuckle, and the ball joint is supported by the extension portion 516. This structure can have a lower cost and lighter weight as compared with the structure in FIG. 39 of U.S. Pat. No. 6,655,487.

However, in the aforementioned knuckle, when the ball joint is supported by the extension portion 516 projecting outwardly from the frame which defines the knuckle, stress is easily concentrated on a portion of the extension portion 516. Therefore, in order to maintain a required strength, the knuckle and the extension portion 516 have to be made of a sufficiently thick member, which causes an increase in cost and weight. Therefore, a low cost and light weight member serving as a connection member of the arm and the knuckle is desired.

Snowmobiles, in particular, are for moving on the snow, and are required to negotiate not only relatively flat snow surfaces like a paved road but often also extremely rough snow surfaces. When traveling on an extremely rough snow surface, the two skis provided on the right and left sides of the vehicle body of the snowmobile may move significantly up and down. In addition, the height of the two skis may change abruptly due to a sudden change in the elevation of the snow surface. Under this situation, as compared with traveling on the flat snow surface, extremely large forces act on the skis. Thus, the snowmobile requires a high strength connection member between the arm and the knuckle.

SUMMARY OF THE INVENTION

In order to overcome the problems described above, preferred embodiments of the present invention provide a snowmobile capable of reducing cost and weight while maintaining its strength.

A snowmobile of a preferred embodiment includes a vehicle body frame, an arm connected to the vehicle body frame, and a knuckle connecting the arm and a ski, wherein the knuckle includes a frame and a connection member connecting the arm and the knuckle, and the knuckle is arranged inside of the frame.

In another preferred embodiment, the connection member is a ball joint.

The ball joint preferably includes a ball portion which is supported by the frame at two points.

In another preferred embodiment, the frame is closed. That is, the periphery of the frame is closed.

In still another preferred embodiment, the frame has a truss shape and the connection member is located at a vertex of a triangle of the truss shape.

It is preferable that the truss shape includes two triangles having a common vertex and the connection member is located at the common vertex of these triangles.

In still another preferred embodiment, the frame has a truss shape, and an opening of the truss shape is directed substantially perpendicular to the forward direction of the vehicle body.

In yet still another preferred embodiment, the knuckle is formed by extrusion molding and is thus made of extruded material.

In yet still another preferred embodiment, the arm includes a lower arm and an upper arm which is arranged higher than the lower arm, and the connection member of at least one of the lower and upper arms is arranged inside of the frame.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereafter, preferred embodiments of the present invention will be described with reference to the drawings. It should be noted that the terms "left", "right", "front", "rear", "up" and "down" used in this specification are defined, unless otherwise specified, according to the normal, forward traveling direction of the vehicle being described. The present invention however is not limited to the following preferred embodiments.

Figure 1:
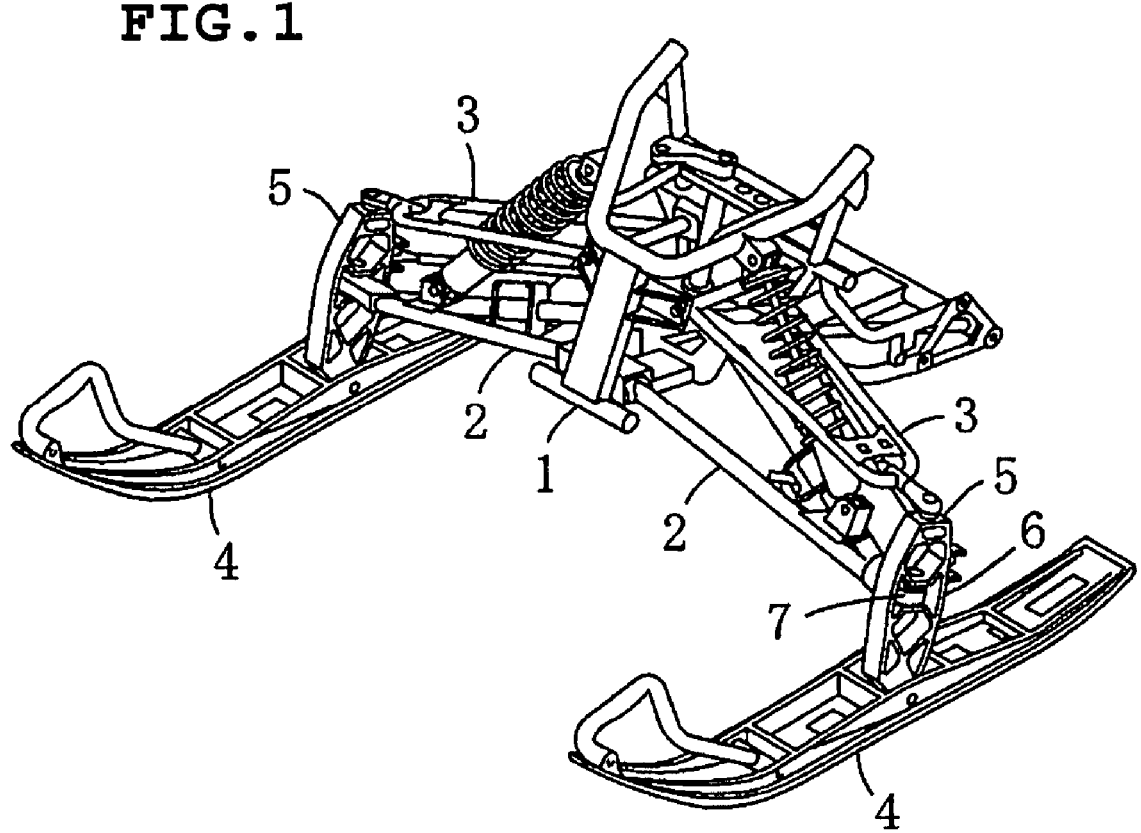
FIG. 1 is a simplified drawing showing a preferred embodiment of the present invention.

FIG. 1 is a drawing showing parts of the snowmobile according to the preferred embodiment of FIG. 1. The snowmobile of the present preferred embodiment includes a vehicle body frame 1, arms 2, 3 connected to the vehicle body frame 1, and knuckles 5 connecting the arms 2, 3 to skis 4. Each knuckle 5 is defined by a frame 6 and a connection member 7 connecting the arms 2, 3 and the knuckle 5, wherein the knuckle 5 is arranged inside of the frame 6.

The arms of the present preferred embodiment include a lower arm 2 and an upper arm 3 which is arranged higher than the lower arm 2. The connection member 7 is connected to at least one of the lower arm 2 and the upper arm 3 and is preferably arranged inside of the frame 6. In the example shown in FIG. 1, the connection member 7 connecting the lower arm 2 and the knuckle 5 is arranged inside of the frame 6.

The connection member 7 shown in FIG. 1 is defined by a ball joint including a ball portion supported by the frame 6 at two points. The frame 6 of the present preferred embodiment preferably has a closed shape. The frame 6 has a truss shape and the connection member 7 is preferably located at the vertex of triangles of the truss shape. In this example, the truss shape includes two triangles having a common vertex, and the connection member 7 is located at the common vertex of these two triangles. In addition, the frame 6 is attached in such a way that an opening of the truss shape is directed substantially perpendicular to the forward direction of the vehicle body. The knuckle 5 is preferably formed by extrusion molding.

The snowmobile of this preferred embodiment includes the vehicle body frame 1, the arms 2, 3, the knuckle 5, and the connection member 7 arranged inside of the frame 6 that defines the knuckle 5. Therefore, a member having a low cost and light weight can be provided as the connection member 7 of the arms 2, 3 and the knuckle 5.

The connection member 7 of the arms 2, 3 and the knuckle 5 are arranged in the frame 6 of the knuckle 5, specifically within the frame 6 and not on a projecting portion as in the aforementioned known art. Therefore, forces can be prevented from acting locally on the connection member 7 (e.g., the connecting position of the projecting portion and the knuckle), and the entire frame 6 can absorb the forces acting on the connection member 7. As a result, the connection member 7 can be provided with the required strength by utilizing a member having low cost and light weight.

When the connection member 7 is a ball joint, the relative position of the arms 2, 3 and the knuckle 5 can have a lot of flexibility, and the forces are acted on the connection member 7 from multiple directions. Accordingly, such a connection member can be made of a member having low cost and light weight.

Moreover, by utilizing a structure in which the ball joint is supported by the frame 6 at two points of the ball portion (e.g., two points on a straight line passing through the center of the ball portion), the strength of the connection member 7 can be further increased.

Furthermore, by providing the frame 6 having a closed shape, the strength of the frame 6 can be increased as compared with the case where the connection member 7 is provided with a non-closed member. As a result, a member having a low cost and light weight can be provided as the connection member 7 between the arms 2, 3 and the knuckle 5.

Moreover, by arranging the frame 6 to have the truss shape, the frame 6 can have an extremely high strength, and as a result, a member having an extremely low cost and light weight can be provided as the connection member 7 between the arms 2, 3 and the knuckle 5.

Moreover, by arranging the connection member 7 at the vertex of the triangles of the truss shape, the connection member 7 on which stress is being acted upon is arranged at the portion having extremely high strength, and the strength of the connection member 7 can be further increased.

Moreover, by arranging the connection member 7 at the vertex of the two triangles of the truss shape, the connection member 7 is connected to each of the four sides forming the triangles of the truss shape. Thus, the strength of the connection member 7 can be further increased.

Moreover, by providing the frame 6 having the truss shape and arranging the opening of the truss shape to be directed substantially perpendicular relative to the forward direction of the vehicle body, the connection member 7 of the arms 2, 3 and the knuckle 5 can be easily positioned. Particularly, the connection member 7 needs to have flexibility with respect to at least two movement directions, an angle changing movement defined by the relation between the knuckle 5 and the arms 2, 3 and a rotational movement of the knuckle 5 relative to the arms 2, 3 (rotational movement during steering). Therefore, the arms 2, 3 which are connected to the connection member 7 need to maintain a range of movement so as to have the flexibility in the two movement directions. As described above, the opening of the truss shape is directed substantially perpendicular to the forward direction of the vehicle body, and thereby it is possible to easily maintain the range of movement of the arms.

Moreover, since the knuckle 5 is formed by extrusion molding, the knuckle 5 and the frame 6 can be easily manufactured.

Furthermore, by applying the present preferred embodiment to the double wishbone arms 2, 3 having the lower arm 2 and the upper arm 3, it is possible to use the knuckle 5 and the connection member 7 having a low cost and lighter weight with a double wishbone suspension.

Hereafter, with reference to FIGS. 2 through 7, preferred embodiments of the present invention will be described in more detail.

Figure 2:
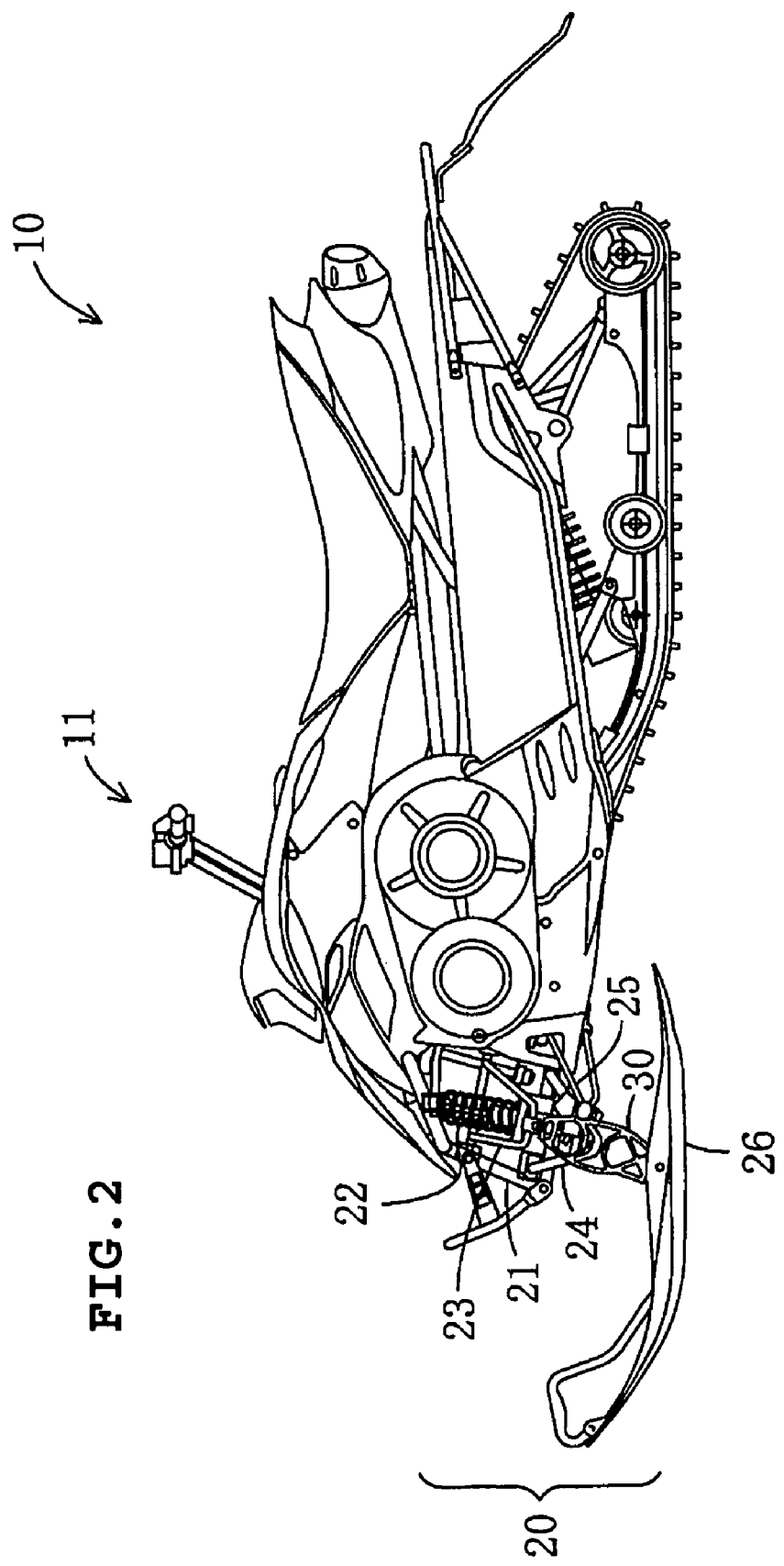
FIG. 2 is a left side view of a snowmobile of a preferred embodiment of the present invention.

FIG. 2 is a left side view of a snowmobile 10 according to a preferred embodiment of the invention. The snowmobile 10 includes a vehicle body frame 21 that spans the entire vehicle body, and an engine mounted at the front portion of the vehicle body on the vehicle body frame 21. The snowmobile 10 also includes a handlebar 11. A driving force from the engine is transferred to a track belt, which is provided at the rear portion of the snowmobile, thereby driving the snowmobile 10 forward or backward while being steered by the handlebar 11.

Figure 3:
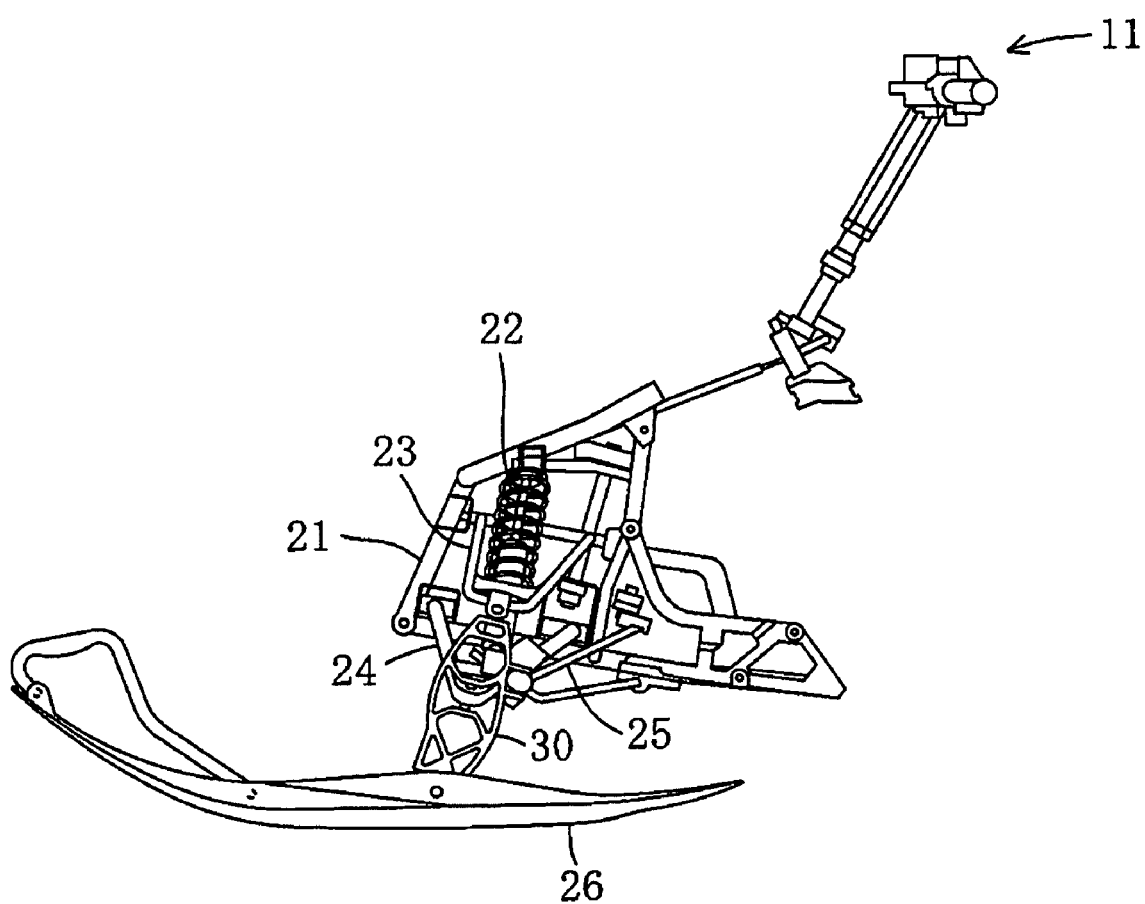
FIG. 3 is a left side view of a suspension.
Figure 4:
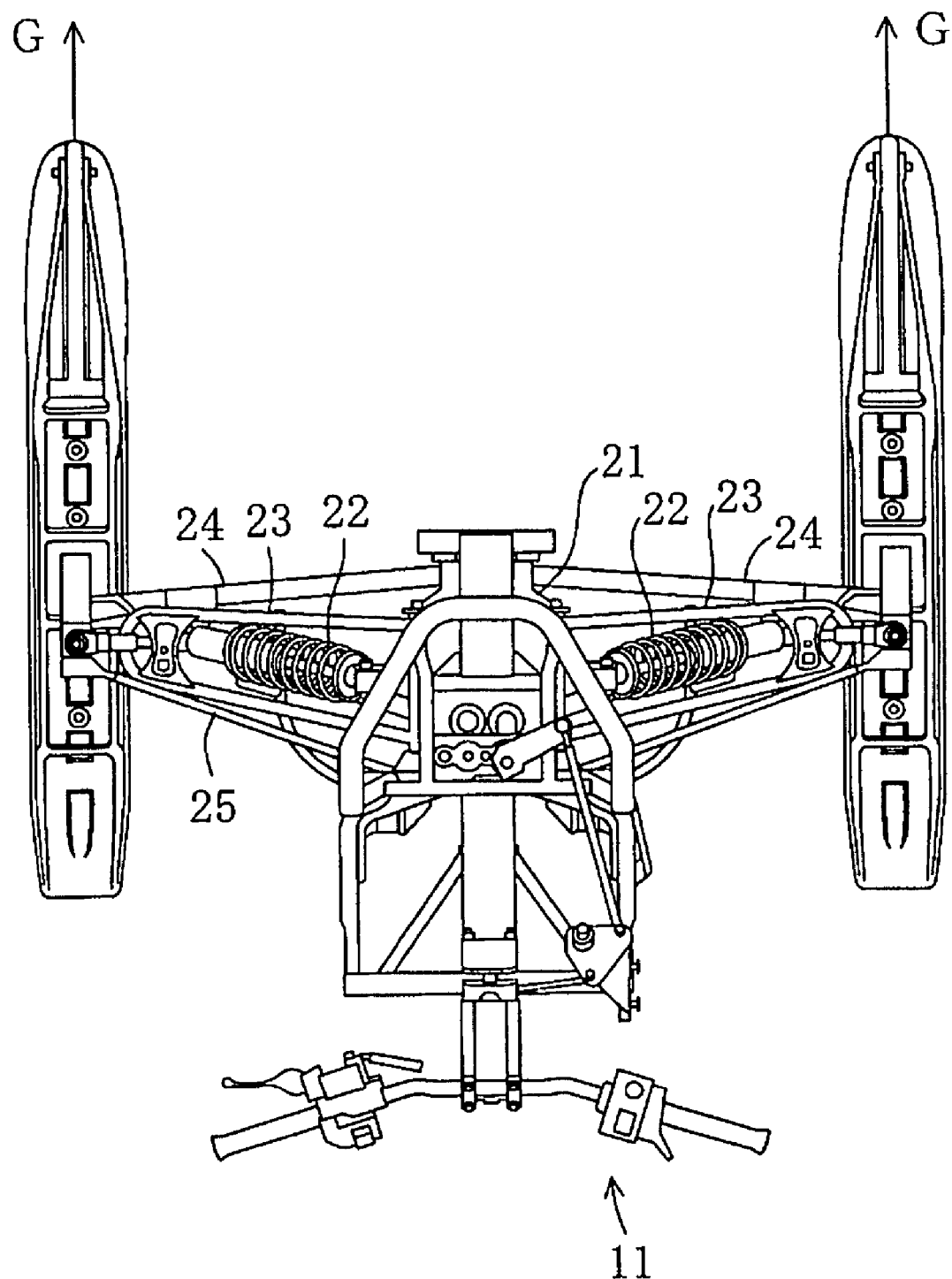
FIG. 4 is a top view of the suspension.
Figure 5:
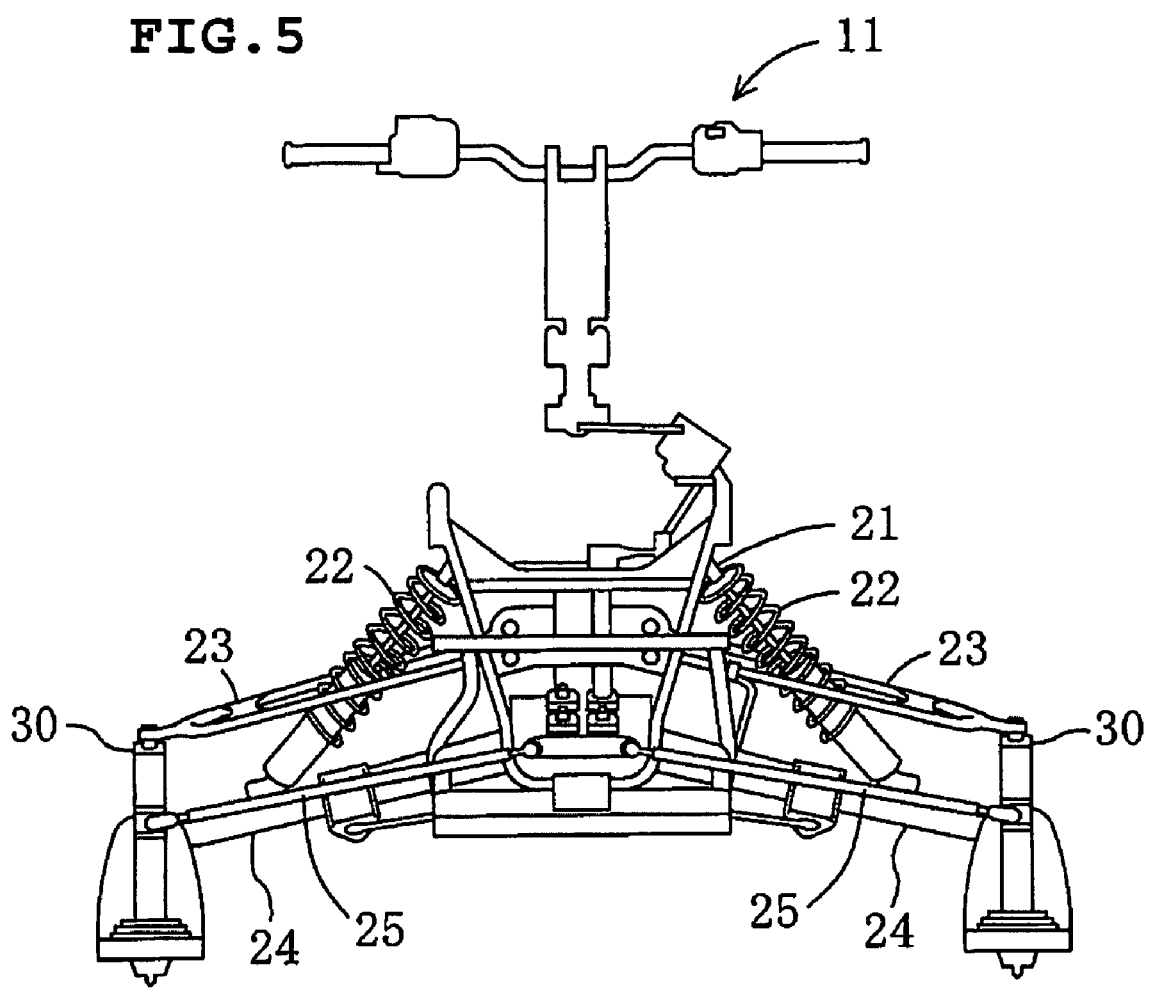
FIG. 5 is a back view of the suspension.

The snowmobile 10 includes a suspension 20 at the front portion of the vehicle body. FIGS. 3 through 5 are views showing only the suspension 20 and the handlebar 11, FIG. 3 is a left side view, FIG. 4 is a top view, and FIG. 5 is a rear view of the suspension 20 and the handlebar 11. The suspension 20 is provided with a shock absorber 22, an upper arm 23, a lower arm 24, a tie rod 25, a ski 26, and a knuckle 30.

In this preferred embodiment, the suspension 20 is a double wishbone suspension. Therefore, the shock absorber 22 is elastic in the axial direction thereof and is a mechanism for reducing forces that cause the expansion and contraction by using a spring and a damper. The shock absorber 22 is connected to a vehicle body frame 21 at one end and to the lower arm 24 at the other end. The shock absorber 22 is rotatably connected to an axis of the vehicle body frame 21 and an axis of the lower arm 24. Therefore, the shock absorber 22 has the flexibility to rotate with respect to the vehicle body frame 21 and the lower arm 24, and reduces forces acting between the vehicle body frame 21 and the lower arm 24 by expansion and contraction.

The upper arm 23 is connected to the vehicle body frame 21 at two points and is rotatable with respect to an axis along the forward and backward direction of the vehicle body. The upper arm 23 includes a pair of cylindrical members. The cylindrical members are connected to the vehicle body frame 21 spaced apart from each other, and extend outward towards each other so as to be connected with each other at their ends. The connected ends are in turn connected to a knuckle 30 via a ball joint.

The lower arm 24 is connected to the vehicle body frame 21 at two points and is rotatable with respect to an axis along the forward and backward direction of vehicle body. The lower arm 24 includes a pair of cylindrical members. The cylindrical members are connected to the vehicle body frame 21 spaced apart from each other, and extend outward towards each other to be connected with each other at their ends. The connected ends are in turn connected to a knuckle 30 via a ball joint.

Therefore, the upper and lower arms 23, 24 are connected to an axis of rotation on the vehicle body frame 21 and are rotatable in a rotating plane on which respective ends are located. Moreover, the rotating plane at the ends of the upper and lower arms 23, 24 is substantially a common plane, on which respective ends (i.e., the ball joint portion) are rotatable. Therefore, the knuckle 30 can move up and down within the rotating plane substantially perpendicular relative to the forward and backward direction of the vehicle body, while being supported by the ball joint of the upper and lower arms 23, 24.

The upper arms 23 form a pair of arms on the upper side of the vehicle body frame and the lower arms 24 form a pair of arms on the lower side of the vehicle body frame 21 as shown in FIG. 2. One of each pair of arms is provided on right and left sides of the vehicle body frame 21. The knuckle 30 is connected to the ski 26 at the lower portion of the knuckle 30. The ski 26 is an elongated member and the lower surface thereof is in contact with the snow surface. The knuckle 30 and the ski 26 are connected to each other so as to be rotatable around the axis of rotation in the direction substantially perpendicular to the longitudinal direction of the ski 26.

Therefore, the forces received by the ski 26 from the snow surface are transferred to the knuckle 30, and the forces received by the knuckle 30 are transferred to the vehicle body frame 21 via the upper and lower arms 23, 24. In this situation, the forces received from the snow surface can be transferred to the vehicle body frame 21 while being minimized by the operation of the shock absorber 22. A pair of the skis 26 are connected to the knuckles 30, respectively, which are provided on the right and left sides of the vehicle body, so as to be parallel with each other in the longitudinal direction of the skis 26. Therefore, the longitudinal direction of the ski 26 is the forward direction of the vehicle body (the reference sign G in FIG. 4).

The knuckle 30, moreover, is connected to the tie rod 25 which transfers steering torque from the handlebar 11, and the direction of the knuckle 30 can be changed depending on the operation of the tie rod 25. The end of the tie rod 25 is connected to the periphery of the knuckle 30 via a ball joint at the rear side of the knuckle 30, and the tie rod 25 can move substantially in the right and left directions with respect to the vehicle body frame 21 in accordance with the steering of the handlebar 11.

Since the upper and lower arms 23, 24 are connected to each other via the ball joint, the knuckle 30 is rotatable about a straight line which connects the ball joints as the axis of rotation, and the knuckle 30 rotates when the tie rod 25 moves in the right and left directions as described above. When the knuckle 30 rotates in this manner, the ski 26 connected to the knuckle 30 simultaneously rotates, and thus the forward direction can be changed. Therefore, by changing the direction of the knuckle 30 with the handlebar 11, the forward direction of the vehicle body can be changed.

As mentioned above, the knuckle 30 transfers the forces received from the ski 26 to the side of vehicle body frame 21 and the steering torque from the handlebar 11 to the ski 26. The snowmobile mainly runs on the snow and is required to negotiate not only relatively flat snow surfaces like a paved road but often also extremely rough snow surfaces. When traveling on extremely rough snow surfaces, the skis 26 of the snowmobile move significantly up and down and receive large forces as compared with a vehicle running on the flat surface. In addition, when running on extremely rough snow surfaces, a driver operates the handlebar 11 to stabilize the vehicle body. Thus, steering during travel in on extremely rough snow surfaces causes the knuckle 30 to receive various forces from the tie rod 25 and the ski 26, and extremely large forces act on the knuckle 30.

Figure 6:
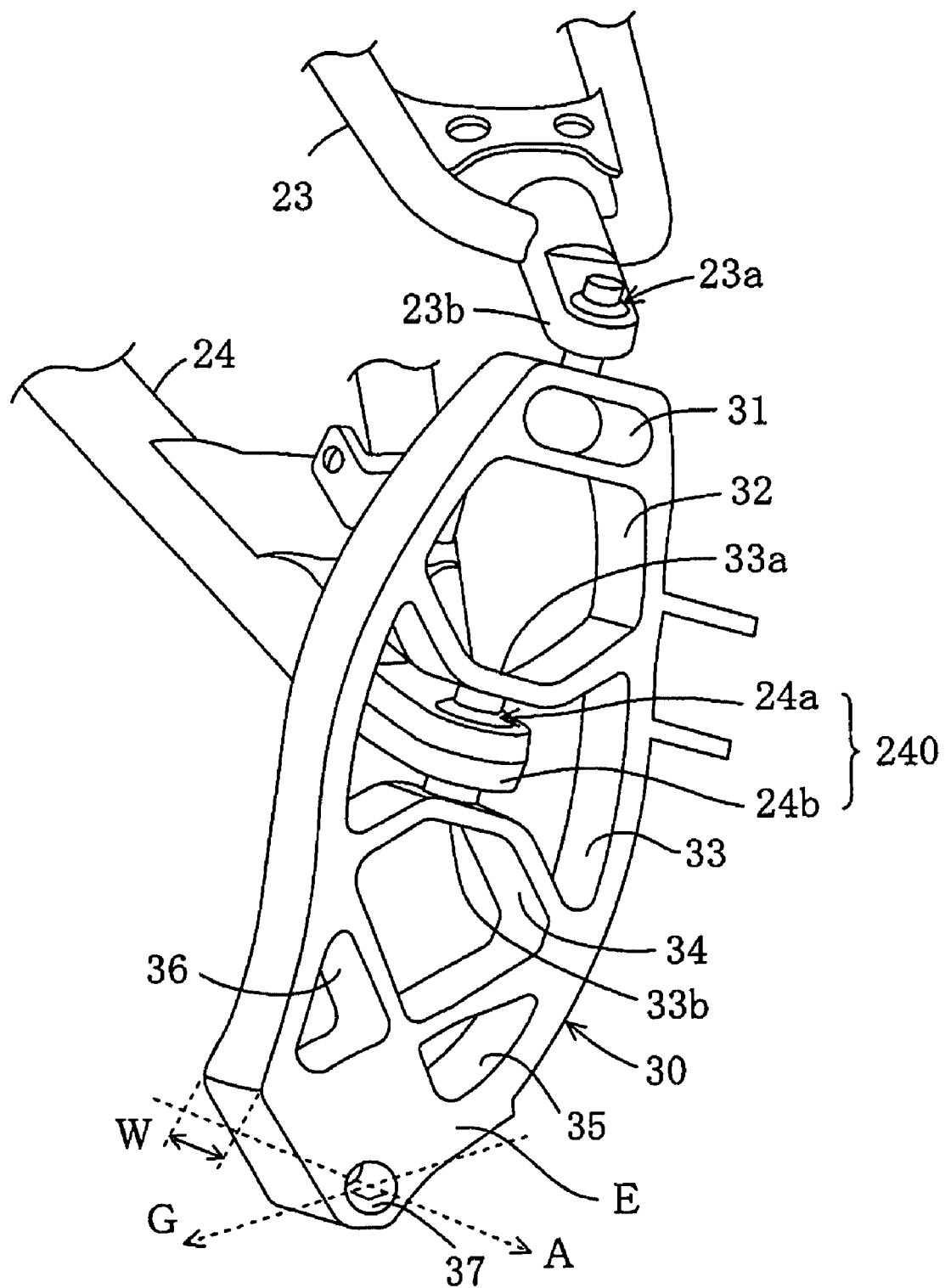
FIG. 6 is a perspective view showing a knuckle.

The knuckle 30 according to this preferred embodiment uses a structure in which the strength of the connection member connected to the lower arm 24 is extremely high. Hereinafter, the structure of the connection member of the knuckle 30 and the lower arm 24 will be described in more detail. FIG. 6 is a perspective view showing the knuckle 30. The knuckle 30 is formed by cutting the member obtained through extrusion molding to a substantially constant width W and providing the inside of the knuckle 30 with a plurality of holes 31 to 37.

Figure 7:
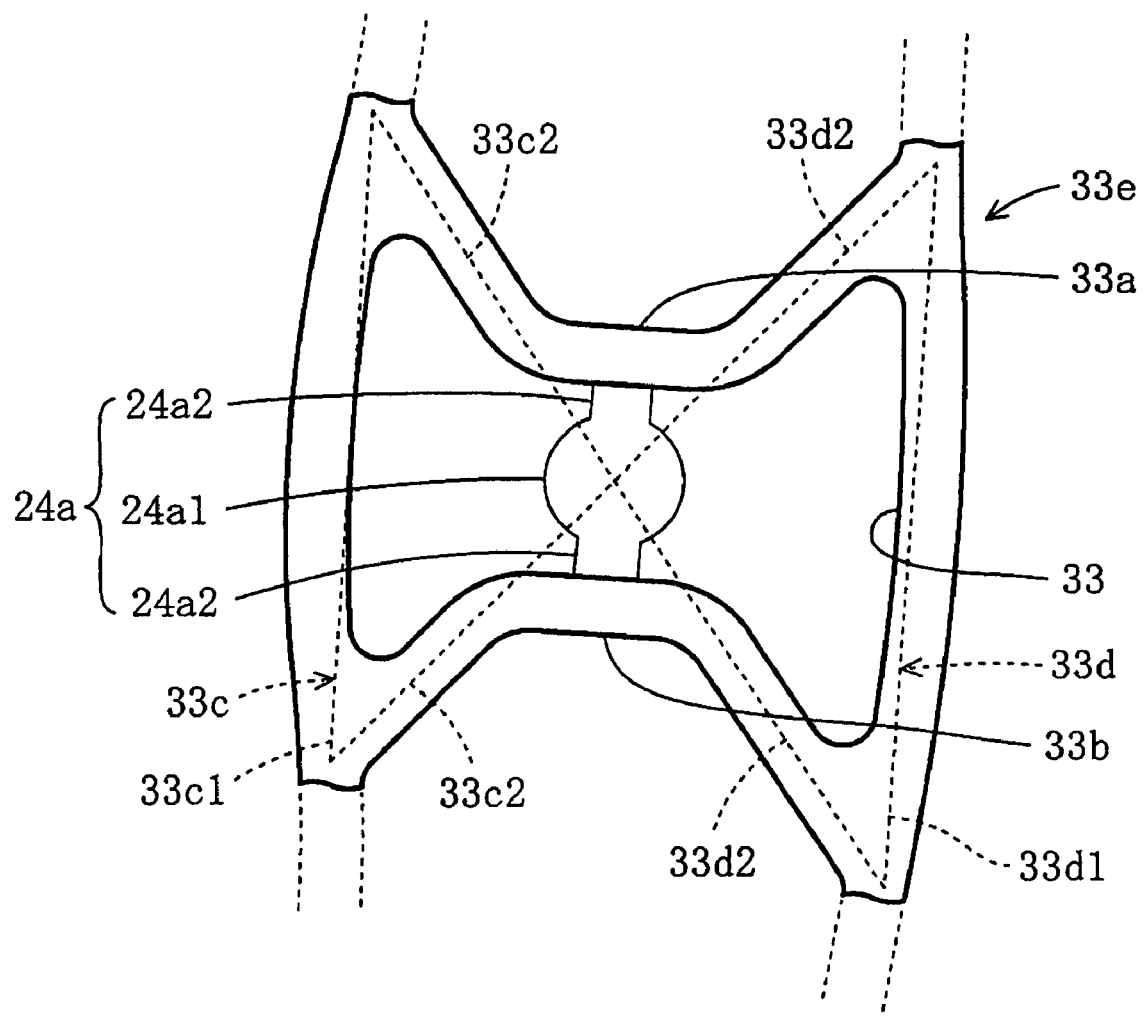
FIG. 7 is a left side view of a frame.

A hole 33 preferably has a substantially rectangular shape whose upper corners protrude upwardly and the lower corners protrude downwardly. The inner wall of the hole 33 and the wall surface of the knuckle 30 define a frame 33e. Here, the hole 33 has no open portions on the inner wall, and in this regard, the frame 33e is a closed frame. FIG. 7 is a left side view of the frame 33e and the thick solid line denotes a portion of the frame 33e that defines a portion of the knuckle 30. As shown in FIGS. 6 and 7, a ball portion 24a is connected to upper and lower sides 33a, 33b inside of the frame 33e (the portion surrounded by the inner wall of the frame 33e).

The ball portion 24a has a shape in which cylindrical members 24a2 are integrally connected to the upper and lower sides of a sphere 24a1. The cylindrical members 24a2 are connected to the upper and lower sides 33a, 33b of the hole 33. This connection is made by fastening, with a bolt (not shown) or the like, the cylindrical members 24a2 to the sides 33a, 33b via holes provided in the sides 33a, 33b. An end 24b of the lower arm 24 can accommodate the sphere 24a1 while exposing the upper and lower sides of the sphere 24a1 of the ball portion 24a. The cylindrical members 24a2 are connected to the upper and lower sides 33a, 33b with the ball portion 24a being accommodated in the end 24b so as to provide a connection member 240 with the ball joint.

The connection member 240 defines two substantially triangular holes with the frame 33e of the hole 33 and the ball portion 24a, resulting in a truss shape. More specifically, as shown in FIG. 7, the frame 33e which defines the inner circumference of the hole 33 is divided into two sections in the forward and backward direction of the vehicle body by the ball portion 24a so as to define triangles 33c, 33d shown by the dashed line. These triangles 33c, 33d are triangles having a common vertex, and the common vertex is substantially coincident with the center point of the sphere 24a1 in the ball portion 24a.

One side of the triangle 33c that is located at the front side of the vehicle body (bottom 33c1) is coincident with the wall surface of the frame 33e. The other two sides of the triangle 33c (oblique sides 33c2) are partially coincident with the wall surface of the frame 33e, and the periphery of the vertex at which these two oblique sides 33c2 connect is coincident with the sphere 24a1. Therefore, almost the entire region of the sides of the triangle 33c is coincident with the frame 33e or the sphere 24a1 and overall defines a triangle.

The triangle 33d is similar to the triangle 33c. One side of the triangle 33d that is located at the rear side of the vehicle body (bottom 33d1) is coincident with the wall surface of the frame 33e. The other two sides of the triangle 33d (oblique sides 33d2) are partially coincident with the wall surface of the frame 33e, and the periphery of the vertex at which these two oblique sides 33d2 connect is coincident with the sphere 24a1. Therefore, almost the entire region of the sides of the triangle 33d is coincident with the frame 33e of the hole 33 or the sphere 24a1 and overall defines a triangle. Hence, the frame 33e and the sphere 24a1 define a truss shape including two triangles.

The knuckle 30 is also connected to the upper arm 23 via a ball joint. Specifically, a ball portion 23a including the sphere and the cylindrical members is connected to the top of the knuckle 30. An end 23b of the upper arm 23 accommodates the sphere while exposing the upper and lower sides of the sphere in the ball portion 23a. In this preferred embodiment, the knuckle 30 is rotatable using the line which connects the centers of the ball portions 24a, 23a as an axis, and can move up and down along the axis when the upper and lower arms 23, 24 rotate about the vehicle body frame.

The hole 37 is an axis for connecting the ski 26 and the knuckle 30, and the axis is substantially perpendicular to the forward direction G of the vehicle body (the longitudinal direction of the ski 26). The inner walls of the holes 31 to 37 are perpendicular to an end surface E of the knuckle 30. The direction perpendicular to the end surface E is coincident with the direction of the axis of hole 37 (direction A in FIG. 6). Here, the direction perpendicular to the end surface E is identical with the opening direction of each of the holes 31 to 37. Therefore, the opening direction of each hole 31 to 37 and the frame 33e is substantially perpendicular to the forward direction of the vehicle body. The opening direction is also identical with the extrusion direction during extrusion molding of the knuckle 30.

According to the aforementioned structure, the connection member 240 including the ball portion 24a has an extremely high strength against the load from the knuckle 30. Therefore, since the connection member 240 is arranged inside of the frame 33e of the knuckle 30, the force acting on the knuckle 30 is transferred to the connection member 240 via the entire frame 33e, and the forces transferred from the lower arm 24 to the connection member 240 is supported by the entire frame 33e. Therefore, compared to the previously described known art, the connection member 240 has a higher strength than the structure in which the connection member 240 is supported on the extension portion projecting outwardly from the knuckle.

Moreover, there is no need to consider thickening or reinforcing the wall surface of the knuckle 30 in order to provide the connection member 240 with a high strength. Thus, the knuckle and the connection member 240 can be provided at a lower cost and with lighter weight as compared with the case of thickening or reinforcing the wall surface of the knuckle 30. Moreover, in the present preferred embodiment, the connection member 240 is supported by the entire frame 33e. Therefore, the strength of the connection member 240 can be easily adjusted by changing the width W of the knuckle 30. The knuckle 30 is formed by extrusion molding as described above, and the width is changed when the extruded material is cut off. Therefore, the strength of the connection member 240 can be easily adjusted.

Since the shock absorber 22 is connected to the lower arm 24, a reaction force from the shock absorber 22 acts on the lower arm 24, and such force is large compared with a force acting on the upper arm 23. In the present preferred embodiment, since the strength of the connection member 240 is increased by connecting the end 24b of the lower arm 24 to the ball portion 24a inside of the frame 33e, the connection member 240 is capable of fully withstanding even the large force acting thereon.

Moreover, the connection member 240 is connected to the upper and lower sides 33a, 33b of the frame 33e via the cylindrical members 24a2 provided at two points on the upper and lower sides of the connection member 240. Therefore, the connection member 240 has a higher strength as compared with the structure in which the connection member 240 is supported at only one point.

Moreover, since the frame 33e is a closed frame, the connection member 240 is supported by the entire frame 33e. Therefore, the connection member 240 with a higher strength can be provided as compared with the case of a non-closed frame.

Moreover, the frame 33e and the connection member 240 define a truss shape and the ball portion 24a of the connection member 240 is substantially coincident with the vertex of the triangles 33c, 33d of the truss shape. Therefore, it is possible to provide the connection member 240 with an extremely high strength as compared with the structure in which the ball portion 24a is coincident with the sides of the triangles 33c, 33d of the truss shape. The ball portion 24a is located at the center of the connection member 240 on which the force acting on the knuckle 30 and the force transferred from the lower arm 24 most easily act. Therefore, by aligning the ball portion 24a and the vertex of the triangles 33c, 33d, the strength of the part on which a large force easily acts is increased, and thus the strength of the connection member 240 can be increased.

Moreover, since the ball portion 24a is substantially coincident with the vertex of the two triangles 33c, 33d, the force acting on the knuckle 30 is transferred to the connection member 240 via four oblique sides 33c2, 33d2 of the two triangles 33c, 33d. The force acting on the lower arm 24 is transferred to the knuckle 30 via four oblique sides 33c2, 33d2 of the two triangles 33c, 33d. Therefore, the connection member 240 with an extremely high strength can be provided as compared with the structure in which one vertex of the triangles of the truss shape is coincident with the ball portion 24a.

Moreover, since the opening direction of the holes 31 to 37 (direction A) is the direction perpendicular to the forward direction G of the vehicle body, the connection member 240 can be easily arranged inside of the frame 33e. Therefore, it is possible to easily connect the lower arm 24 and the knuckle 30 without reducing the rotational flexibility of the lower arm 24.

Furthermore, since the knuckle 30 is preferably formed by extrusion molding, it is possible to easily produce the knuckle 30 having a complicated shape. Therefore, the knuckle having a desired design can be produced at a low cost. Furthermore, since the knuckle 30 can be formed by processing the extruded member, it is possible to easily produce the knuckle 30 with a high strength including the frame 33e without welding or reinforcing the wall surface forming the knuckle 30. Thus, the weight of the knuckle 30 can be reduced.

The aforementioned preferred embodiments are only preferred embodiments of the present invention, and the present invention is not limited thereto. For example, in a strut suspension, a trailing arm suspension, a torsion beam suspension or the like, the connection member connecting the knuckle, which is connected to the ski, and the arm, which is connected to the suspension, may be arranged inside of the frame of the knuckle. In these embodiments, the strength of the connection member can also be increased.

The joint of the connection member is not limited to a ball joint. Since it is sufficient for the connection member of the knuckle and the arms to have the flexibility in at least two movement directions, the arms and the connection member may be connected to each other via a joint defining two different rotation axes.

The connection member of the upper arm and the knuckle may be arranged inside of the frame of the knuckle (e.g., the inside of the hole 31). According to the structure, the strength of the connection member of the upper arm and the knuckle can be increased.

The ball portion 24*a* may be connected to the knuckle 30 in forward and backward sides of the frame 33*e*. In this structure, it is also preferable that the frame 33*e* and the ball portion 24*a* define a truss shape, and it is more desirable that the ball portion 24*a* is located at the vertex of the triangles of the truss shape.

According to the preferred embodiments above, the frame 33*e* and the ball portion 24*a* define the truss shape including the two triangles, but the number of triangles is not limited to two. Three or more triangles having a common vertex may be provided in the knuckle and the ball portion of the ball joint may be arranged at the vertex. According to the structure, the connection member can be strengthened further.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   a vehicle body frame;
   an arm connected to the vehicle body frame;
   a knuckle connecting the arm to a ski, the knuckle including a frame having two walls spaced apart from one another in a forward and rearward direction of the snowmobile; and
   a connection member connecting the arm and the knuckle; wherein
   the connection member is arranged between the two walls of the frame of the knuckle.

2. The snowmobile according to claim 1, wherein the connection member comprises a ball joint.

3. The snowmobile according to claim 2, wherein the ball joint comprises a ball portion which is supported by the frame at two points.

4. The snowmobile according to claim 1, wherein the frame has a closed periphery.

5. The snowmobile according to claim 1, wherein the frame defines a truss, and the connection member is located at a vertex of a triangle of the truss.

6. The snowmobile according to claim 5, wherein the truss includes two triangles having a common vertex, and the connection member is located at the common vertex of the two triangles.

7. The snowmobile according to claim 1, wherein the frame defines a truss, and an opening direction of the truss is substantially perpendicular to a forward direction of the snowmobile.

8. The snowmobile according to claim 1, wherein the knuckle is an extruded knuckle.

9. The snowmobile according to claim 1, wherein the arm further includes a lower arm and an upper arm arranged higher than the lower arm, and the connection member is connected to at least one of the lower arm and the upper arm.

* * * * *